United States Patent
Yu et al.

(10) Patent No.: US 7,010,716 B2
(45) Date of Patent: Mar. 7, 2006

(54) METHOD AND APPARATUS FOR DEFINING FAILOVER EVENTS IN A NETWORK DEVICE

(75) Inventors: Ken Yu, Burlington, MA (US); Shang Chang, Medford, MA (US)

(73) Assignee: Nortel Networks, Ltd, St. Laurent (CA)

( * ) Notice: Subject to any disclaimer, the term of this patent is extended or adjusted under 35 U.S.C. 154(b) by 515 days.

(21) Appl. No.: 10/192,252

(22) Filed: Jul. 10, 2002

(65) Prior Publication Data

US 2004/0010731 A1    Jan. 15, 2004

(51) Int. Cl.
*G06F 11/00* (2006.01)

(52) U.S. Cl. .......................................... 714/4; 709/239
(58) Field of Classification Search .................... 714/4, 714/3, 41, 43–44, 56; 709/239; 370/217, 370/220, 248, 351, 355
See application file for complete search history.

(56) References Cited

U.S. PATENT DOCUMENTS

| | | | |
|---|---|---|---|
| 6,738,345 B1 * | 5/2004 | Williamson | 370/217 |
| 6,763,479 B1 * | 7/2004 | Hebert | 714/4 |
| 2001/0056503 A1 * | 12/2001 | Hibbard | 709/250 |
| 2002/0141332 A1 * | 10/2002 | Barnard et al. | 370/218 |
| 2003/0140132 A1 * | 7/2003 | Champagne et al. | 709/223 |
| 2003/0198182 A1 * | 10/2003 | Pegrum et al. | 370/225 |

OTHER PUBLICATIONS

Extreme Standby Router Protocol, ExtremeWare Software User Guide, pp. 14-1 to 15-14.
Internet Engineering Task Force (IETF) Request For Comments (RFC) 2338, Virtual Router Redundancy Protocol, S. Knight, et al., Apr. 1998.

* cited by examiner

*Primary Examiner*—Dieu-Minh Le
(74) *Attorney, Agent, or Firm*—John C. Gorecki

(57) ABSTRACT

An user may define failover events in a network device by customizing the network device's response to a failure on the network. Specifically, an user may instruct the network device to activate or deactivate one or more interfaces, or undergo any number of additional communications, upon a perceived network failure or critical interface failure. This enables the network device to initiate or terminate connectivity with one or more network devices, as well as optionally performing failover to a standby network device, to enable the network device to more smoothly handle failover procedures and transition traffic to the network device that will be responsible for communication after failover has been effected.

18 Claims, 4 Drawing Sheets

METHOD AND APPARATUS FOR DEFINING FAILOVER EVENTS IN A NETWORK DEVICE

BACKGROUND OF THE INVENTION

1. Field of the Invention

The present invention relates to communication networks and, more particularly, to a method and apparatus for defining failover events in a network device.

2. Description of the Related Art

Data communication networks may include various computers, servers, nodes, routers, switches, hubs, proxies, and other network devices coupled to and configured to pass data to one another. These various network elements will be referred to herein as "network devices." Data is communicated through the data communication network by passing data packets (or data cells or segments) between the network devices by utilizing one or more communication links between the devices. A particular packet may be handled by multiple network devices and cross multiple communication links as it travels between its source and its destination over the network.

A particular physical network device may be logically partitioned into multiple logical network devices to facilitate network management and increase the number and types of services offered by that network device. For example, a router may be partitioned into multiple virtual routers, each of which is a collection of threads, either static or dynamic, that provides routing and forwarding services much like physical routers. A virtual router need not be a separate operating system process (although it could be); it simply has to provide the illusion that a dedicated router is available to satisfy the needs of the network(s) to which it is connected.

As data networks have grown in complexity and speed, the network devices used in those networks have likewise increased in complexity and speed. Unfortunately, this complexity provides manifest opportunities for the network to fail. To increase the reliability of the network, networks are designed such that in the event of a failure of a network device or link, an alternate network device or link may be used until a repair can be made to the failed element. This notion will be referred to herein as "redundancy."

As services offered over networks become increasingly complex, for example layer 2 and layer 3 virtual private networks (VPNs) are deployed, and virtual private LAN segment (VPLS) services are made available, redundancy becomes increasingly important, and also increasingly difficult. Specifically, the redundant network devices must share information as to the types of tunnels, etc. that are being set up, so that in the event of failure of one network device another network device can continue to offer these specialized services. The process undertaken by the network device(s) to exchange responsibility for provision of services will be referred to herein as failover.

The various network devices on the communications network communicate with each other using predefined sets of rules, referred to herein as protocols. Different protocols are used to govern different aspects of the communication, such as how signals should be formed for transmission between network devices, various aspects of what the data packets should look like, and how packets should be handled by the network devices.

One particular protocol, known as Virtual Router Redundancy Protocol (VRRP), specifies an election protocol for use in a broadcast domain, such as an Ethernet domain, that dynamically assigns responsibility for a virtual router to one of the physical VRRP routers on a local area network. This allows any of the virtual router IP (internet protocol) addresses on the local area network (LAN) to be used as the default first hop router by end-hosts. VRRP is described in greater detail in Internet Engineering Task Force (IETF) Request For Comments (RFC) 2338, the content of which is hereby incorporated herein by reference in its entirety.

VRRP normally permits two or more routers to share state information so that one of the routers can function as a "hot standby" for the other. It is combined with a "keep alive" mechanism such that when the standby router detects a failure of the primary, it is able to then impersonate the primary router during failover. One advantage gained by using VRRP is a higher availability default party without requiring configuration of dynamic routing or router discovery protocols on the end hosts.

Conventional network devices remedy failure through failover to the standby network device. While this conventional approach may work well in many situations, the inability to control the network device's response to failure in the network limits the network device's ability to provide advanced services and to continue to develop with the network.

SUMMARY OF THE INVENTION

The present invention overcomes these and other drawbacks by providing a method and apparatus through which an user may define failover events in a network device by customizing the network device's response to a failure on the network. Specifically, an user may instruct the network device to activate or deactivate one or more interfaces, or undergo any number of additional communications, upon a perceived network failure or critical interface failure. This enables the network device to initiate or terminate connectivity with one or more network devices, as well as optionally performing failover to a standby network device, to enable the network device to more smoothly handle failover procedures and transition traffic to the network device that will be responsible for communication after failover is complete.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

As described in greater detail below, the invention enables an user to customize the network device's response to a perceived failure on the network by specifying the actions to be taken by the network device. In this embodiment, the network device can be instructed to deactivate one or more network interfaces, activate one or more network interfaces, or take other actions in response to a perceived failure, such as issue packets over an existing interface to communicate with other network devices configured to communicate with the network device over that existing interface. By enabling the network device to take actions in addition to or instead of performing failover, the network device may be able to more smoothly transition control over a particular interface to a standby network device. The interfaces may be assigned to interface groups and interface groups may be assigned to a critical interface as well.

Interface Groups and the Critical Interface

Figure 7:
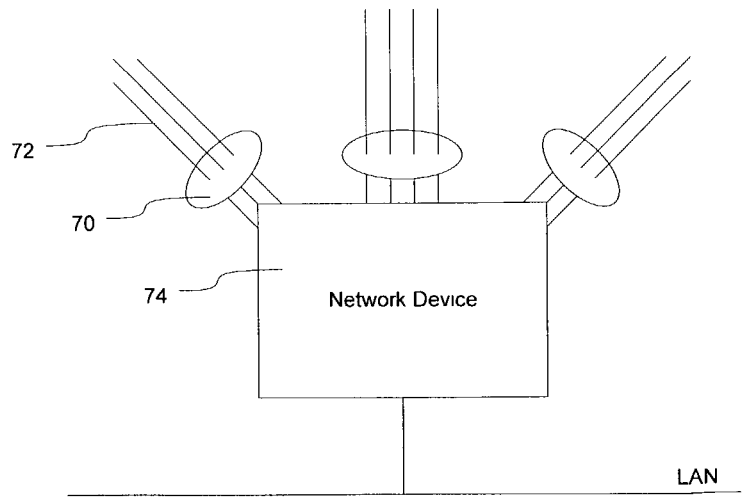
FIG. 7 is a functional block diagram of a network device illustrating interfaces grouped into interface groups.

An Interface Group is a group of interfaces selected by the network manager to collectively define when one or more network device should perform failover. The interface group may include one or more physical interfaces, one or more IP addresses, one or more tunnel interfaces, or any combination thereof. For example, the members of an interface group may include the IP address of Firewall, LDAP/RADIUS server, branch office tunnel, VPN tunnel, LAN/WAN physical interface, and an IP interface (e.g. Virtual circuit in ATM/FR) supported by the system, although the invention is not limited to these illustrative examples. The formation of interface groups 70 from individual interfaces 72 to the network device 74 is illustrated in FIG. 7.

An Interface Group has three status: Up, Down, and Quasi. In one embodiment of the invention, when all the member interfaces are up, the status is UP; when all the interfaces are down, the status is DOWN; when at least one interface is down, and at least one interface is up, the status is QUASI. Other embodiments may employ different conventions and the invention is not limited to this particular embodiment.

Interface groups are not limited to IP interfaces on a particular VRRP master. Rather, an interface group may be associated with more than one VRRP master interface. Likewise, an interface group may be associated with more than one private physical interface running VRRP. Thus if the interface group goes down, all associated master interfaces will perform failover.

The network device manager may assign a name to the interface group to enable the interface group to be referenced at a later time. In one embodiment, the network manager may also add additional or delete existing IP interfaces from the interface group once it has been established, although the invention is not limited to network devices employing this feature.

A physical interface on which VRRP has been configured to run as master is called a VRRP master. According to one embodiment of the invention, a LAN interface that is running as a VRRP master is associated with a critical interface. The critical interface, in this embodiment, is a collection of one or more Interface Groups. When one or more Interface Groups in the Critical Interface goes DOWN, the VRRP master will perform a VRRP-like failover and cause mastership to transfer to the VRRP standby network device. Specifically, when any one of the interface groups goes down, the VRRP master sends a packet with priority 0 advertising to the VRRP standby to assume mastership of the virtual IP address. Alternatively, the VRRP master may keep quiet and discontinue sending out keep alive messages, in which case mastership of the virtual IP address will be timed out after a predetermined period. In either event, mastership of the virtual IP address will be transferred from the master to the standby network device. The VRRP master interface will stay in the DOWN state until all associate interface groups have come UP, and then will reclaim mastership of the virtual IP address. Since an interface group in the QUASI state is not DOWN, the Critical Interface will treat an Interface Group in QUASI state as UP.

VRRP is a state machine protocol that specifies three states for the LAN interface: Initialization, Backup, and Master. According to one embodiment of the invention, a fourth state, Critical, is added to the conventional VRRP states. Critical state, in this context, means that at least one of the interface groups associated with the Critical Interface is DOWN. This enables the network device to distinguish between an actual failure of the physical interface and a "faked" failure associated with the Critical Interface going DOWN.

The VRRP master will stay in the Critical state until all the associated interface groups are UP, or are administratively disabled or removed. When all interface groups associated with the critical interface return to UP status, the system reclaims mastership of the VRRP interface.

During initialization state, if a virtual router becomes the Master for an interface, it checks if there are associated interface groups associated with its critical interface. If there are, the virtual router then checks the status of all interface groups associated with the critical interface. If the status of all of the associated interface groups is UP, then the virtual router assumes mastership of the interface. Otherwise, the virtual router becomes the backup virtual router and remains in that state until the status of all interface groups associated with the critical interface is UP.

The critical interface, according to one embodiment of the invention, is only enabled where the physical interface is configured as a VRRP master, and is not enabled where the physical interface is configured as a VRRP backup, even where the VRRP backup has assumed mastership. By configuring the physical interfaces in this manner the backup is more robust and less likely to attempt failover where there isn't another network device to assume mastership from the backup network device.

Interface Group and Critical Interface Examples

Figure 1:
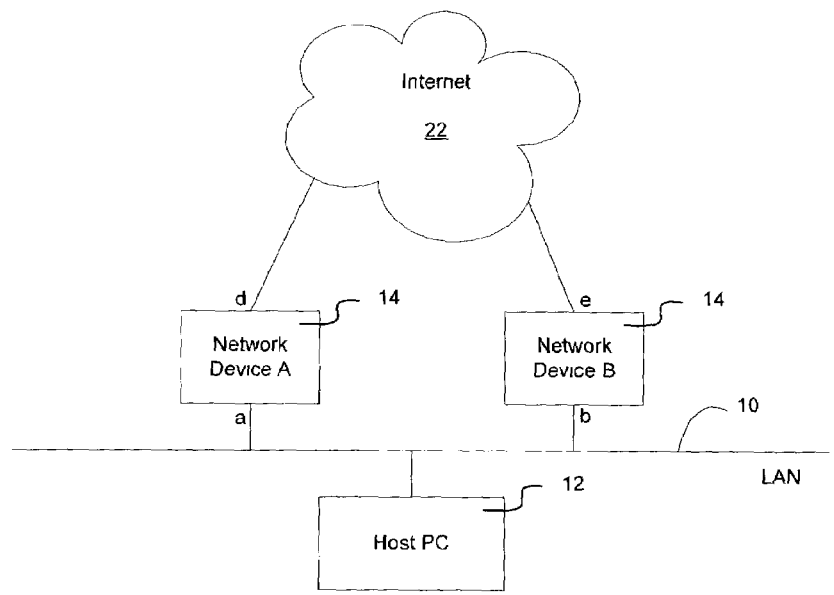
FIGS. 1–4 are functional block diagrams of example networks configured to implement embodiments of the invention.

FIG. 1 illustrates an example in which a local area network LAN 10 is configured to interconnect a host PC 12 and two network devices 14, designated in FIG. 1 as network devices A and B. In this example, VRRP is configured on the private physical interface "a" on network device A, and on private physical interface "b" on network device B. Network device A and network device B are configured to back each other up in this network with network device A as the master and network device B as the standby.

Assume, for this example, that tunnel interfaces "d" and "e" connect network devices A and B to a remote system (not illustrated) across the Internet 22. To effect automatic fail over between network device A and network device B, it has been conventionally necessary to run a dynamic routing protocol, such as OSPF, on the private network 10 and on the tunnel interfaces "d" and "e." Unfortunately, many network managers are reluctant to use dynamic routing on the LAN just to effect failover, since it is difficult to provide secure tunnels through the Internet using dynamic routing.

By defining a VRRP critical interface, as described in greater detail above, it is possible to effect failover upon failure of a tunnel. Specifically, in this example, the network manager would first define an interface group containing the tunnel interface "d." The network manager would then assign this interface group to a critical interface associated with the private physical interface "a" of network device A. Thus, if the tunnel goes down, the interface group is down, and the critical interface associated with network device A will be down. This will cause network device A to instruct network device B to assume mastership of the virtual IP address associated with the private physical interface "a" of network device A, which will, in turn, cause network device B to assume mastership for that interface. Thus, tunnel failover may be achieved without running a dynamic routing protocol.

Figure 2:
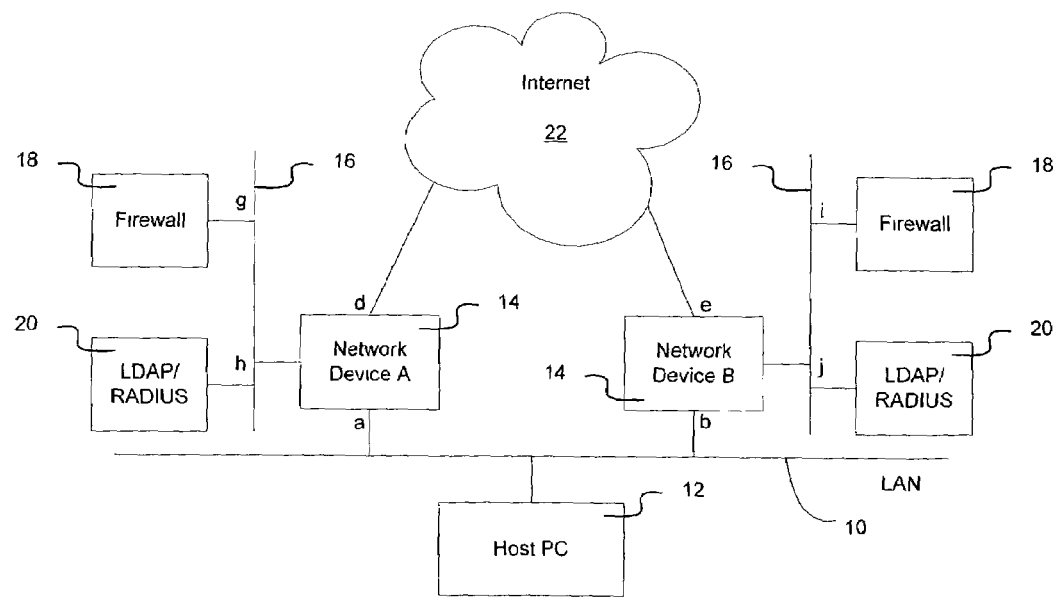

Another example is illustrated in FIG. 2. In this example, as in the example illustrated in FIG. 2, a local area network LAN 10 is configured to interconnect a host PC 12 and two network devices 14, designated in FIG. 2 as network devices A and B. In this example, VRRP is configured on the private physical interface "a" on network device A, and on private physical interface "b" on network device B. Network device A and network device B are configured to back each other up in this network with network device A as the master and network device B as the standby. In this example, each network device is further configured to be connected to a secondary LAN 16 interconnecting the network device with a firewall 18 and LDAP/RADIUS server 20.

A server hosting a LDAP directory will be referred to herein as an LDAP server. LDAP (Lightweight Directory Access Protocol) is a client-server protocol for accessing a directory service. LDAP allows a user to locate organizations, individuals, and other resources such as files and devices in a network whether or not the user knows the domain name, IP address, or geographic whereabouts of the resource. An LDAP directory can be distributed among many servers on a network, then replicated and synchronized regularly.

RADIUS (Remote Authentication Dial-In User Service) is a client/server protocol and software that enables remote access servers to communicate with a central server to authenticate dial-in users and authorize their access to the requested system or service. RADIUS allows a company to maintain user profiles in a central database that all remote servers can share. It provides better security, allowing a company to set up a policy that can be applied at a single administered network point.

Assume for this example that the network manager would like to effect failover if the tunnel interface "d" is down, or if the firewall and the LDAP/RADIUS server are down. In this example, the network manager would first define a first interface group containing the tunnel interface "d" and then define a second interface group containing the firewall interface "g" and LDAP/RADIUS server interface "h." Optionally, the network manager could also define a third interface group containing the interface to the LAN 16. The network manager would then assign these interface groups to the critical interface associated with the private physical interface "a" on network device A.

Since all members of an interface group must be down to cause the interface group to assume DOWN status, a failure at tunnel interface "d" will cause the tunnel interface group to go DOWN. Similarly, a failure of both the firewall interface "g" and the LDAP/RADIUS interface "h" will cause that associated interface group to assume a DOWN status. A failure of either the firewall interface "g" or the LDAP/RADIUS interface "h," by itself, however, will not cause that associated interface group to assume a DOWN status. If either interface group goes DOWN, the critical interface will be DOWN, and mastership will pass to network device B. Accordingly, the network manager of the network device has great flexibility in determining what combinations of events should cause the network device to failover and what combinations of events should be tolerated by the network device.

Customized Response to Perceived Failure on the Network

As described above, when a critical interface goes down, the network device performs a forced failover to cause mastership to pass to standby network device. Situations may arise, however, where it is instead desirable to take other action or, optionally, to take other actions in addition to switching mastership to the standby network device. For example, in certain situations, it may be advantageous to enable the network device to respond to perceived network failures by selectively enabling or disabling one or more interfaces or interface groups.

Figure 3:
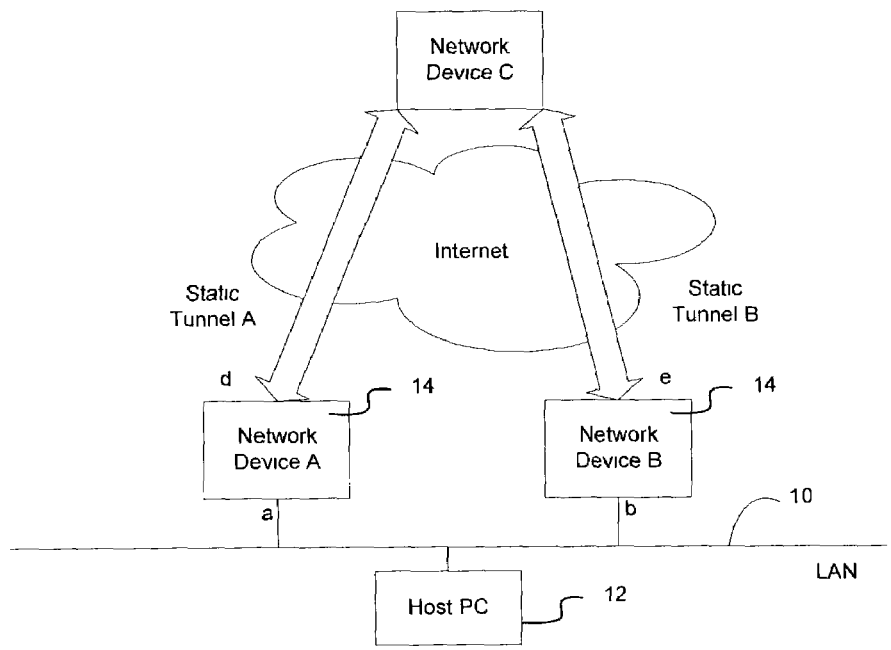

One example of where it may be advantageous to disable an interface to the network device is illustrated in FIG. 3. In the example illustrated in FIG. 3, network device A is configured as the VRRP master and network device B is configured as the VRRP standby. Two tunnels, static tunnel A and static tunnel B, are connected between network devices A and C, and network devices B and C, respectively. Static tunnel A, in this example, has a cost of 0 and static tunnel B has a cost of 2. Because of the cost of the two static tunnels, static tunnel A will become the primary tunnel and static tunnel B will become the secondary tunnel, and traffic will flow through static tunnel A.

If the critical interface to network device A causes network device A to failover to network device B, network device B will assume mastership of the virtual IP address on the LAN 10. However, network device C does not know that traffic should be rerouted to the secondary static tunnel because the tunnel interface "d" on network device A is still operational. Thus, traffic will continue to arrive from network device C at tunnel interface "d" on network device A.

According to one embodiment of the invention, by enabling the network manager to specify that the interface d should be deactivated upon critical interface failover, the network device is provided with the ability to disable the static tunnel to thereby cause traffic to be automatically rerouted to the alternate static tunnel. In this embodiment, the network device may disable the interface d by either timing out, or more preferably, by communicating with the network device C to instruct network device C that the tunnel is being shut down.

By deactivating the interface during the failover procedure, using the inherent static tunnel failover routing protocol features, the network device C will recognize that the static tunnel has been shut down and will automatically reroute all user traffic to the secondary static tunnel connected to network device B. Later, when network device A regains mastership, the deactivated member in the critical interface will be reactivated. Optionally, interface e on network device B may likewise be deactivated when mastership is restored to network device A, to cause network device C to route traffic back through the primary tunnel. Thus, tunnel failover can be achieved without running a dynamic routing protocol.

Figure 4:
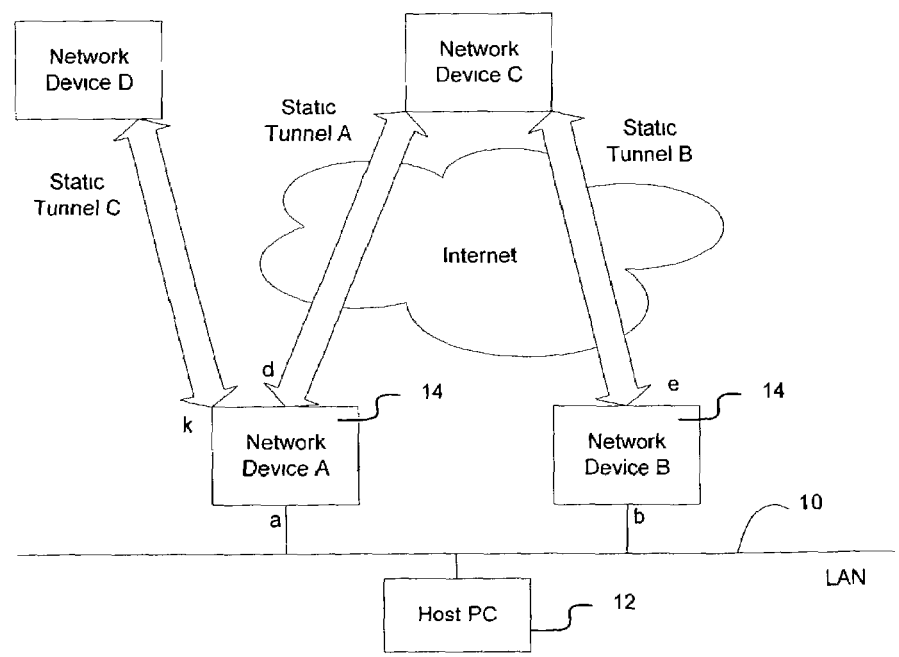

A network device may also find it advantageous to selectively enable another interface upon VRRP failover. For example, as illustrated in FIG. 4, a network device with a static tunnel to network device C may wish to open a static tunnel to network device D upon VRRP failover. This may be desirable in any number of situations, such as to enable continued communication through the network via a different tunnel or to enable a network manager to assess and repair the perceived failure. Accordingly, according to another embodiment of the invention, the network manager is provided with the ability to selectively enable interfaces upon critical interface failover.

Although deactivation or activation of one or more interfaces may be of particular use in connection with handling static tunnels, it may also be more broadly applicable to other IP addresses as well. Thus, when a critical interface is DOWN, the network manager may elect to activate or deactivate one or more interface groups or members of an interface group. Enabling selective activation or deactivation in the event of forced failover provides the network manager enhanced flexibility in handling failure scenarios in the network.

In operation, during the failover procedure for primary IP address failure or for forced failover, all interfaces to the network device or, optionally, all members of each of the critical interface groups, will be scanned to determine if there is an activation or deactivation indication. If the deactivation indicator is found, the IP address will be used to locate the tunnel and the tunnel will be disabled. If the IP address is an interface IP address, it will be disabled. Similarly, if the enable indicator is found, the IP address will be enabled and the network device will continue to communicate via that interface even though mastership of the virtual IP address will pass to the standby network device through failover procedures.

Implementation

Figure 5:
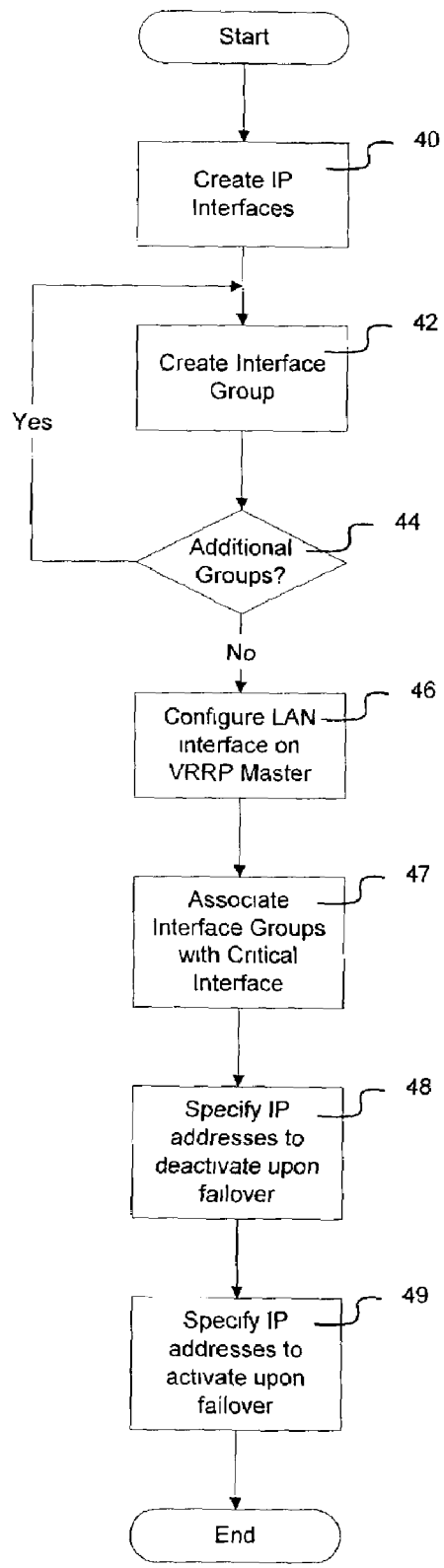
FIG. 5 is a flowchart of an example of software that can be used to implement one embodiment of the invention.

FIG. 5 illustrates a flowchart of an example of software that can be used to implement an embodiment of the invention. As shown in FIG. 5, the network manager will first create the IP interfaces that need to be covered in the failover scenario (40). Once all IP interfaces have been created, the network manager will create an Interface Group (42), give a name to that group, and select the IP interfaces from the list of IP interfaces that are to become members of that group. Typically these members are the interfaces that needed to be backed up upon failure or that are important to operation of, or services provided by, the network device. If desired, more than one Interface Group may be created for a given VRRP master (44), although a network device manager may decide, for practical considerations, to limit the number of interface groups (e.g. a maximum of three groups) that may be associated with a given particular VRRP master.

Once the IP interfaces and Interface Groups have been defined, the LAN interface on the VRRP master that will cause the failover is configured (46). The LAN interface of the VRRP master should not be a member of any of the interface groups associated with it, however, since VRRP will cause failover of the VRRP master if the physical interface fails. Accordingly, defining the LAN interface as a member of an interface group may cause the VRRP master to failover according to VRRP, as well as perform a forced failover according to concepts described herein. This may cause confusion and, for practical reasons, should be avoided.

Interface groups are then assigned to the critical interface for the VRRP master (47). In operation, the network device will use the critical interface to effect failover as directed by the network manager. Optionally, as discussed in greater detail above, the network manager may specify one or more of the IP addresses to be deactivated upon failover (48), or to be activated upon failover (49).

Figure 6:
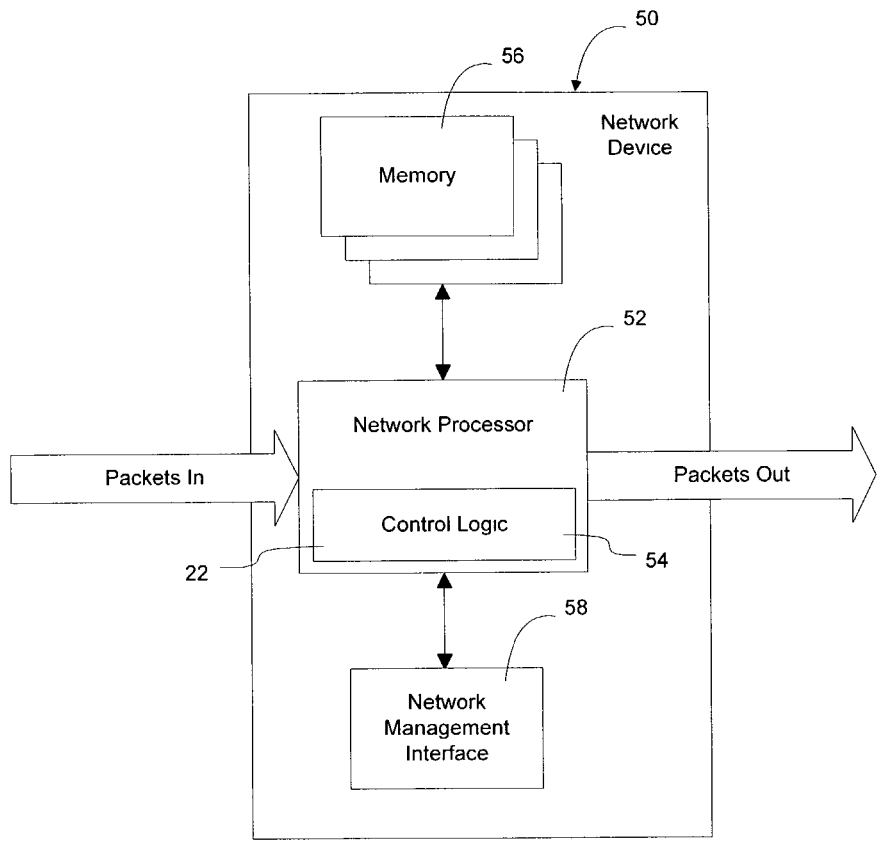
FIG. 6 is a functional block diagram of a network device according to an embodiment of the invention.

One example of a network device that may be used in connection with the various embodiments of this invention is illustrated in FIG. 6. As shown in FIG. 6, a network device 50 configured to receive packets and output packets includes, in this embodiment, a network processor 52 with control logic 54 configured to implement the functions described in greater detail above. A memory 56, internal to the network device as shown, or external to the network device, may be provided to store computer instructions to enable the network device to perform the functions ascribed to it herein. A physical or virtual network management interface 58 may be provided to enable the network manager to interact with the network device.

The control logic 54 of the network device may be implemented as a set of program instructions that are stored in a computer readable memory 56 and executed on a microprocessor, such as network processor 52. However, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method for defining a failover event on a network device, the method comprising the steps of:

defining an interface group including at least a first interface on the network device, said interface group having an interface group status;

assigning the interface group to a critical interface on the network device, said critical interface being different than the first interface;

detecting a change in the interface group status from a first interface group status state to a second interface group status state; and altering a state of the critical interface on the network device in response to the detected change in the interface group status.

2. The method of claim 1, wherein the step of altering the state of the critical interface comprises deactivating the critical interface.

3. The method of claim 2, wherein the critical interface comprises an interface to a local area network.

4. The method of claim 1, wherein the interface group further comprises at least a second interface, and wherein the method further comprises the step of activating the second interface in response to the detected change in the interface group status.

5. The method of claim 1, wherein the interface group further comprises a second interface to a static tunnel, and wherein the method further comprises the a step of deactivating the second interface in response to the detected change in the interface group status.

6. The method of claim 4, wherein the second interface is an interface to a link to a network manager.

7. The method of claim 1, wherein the step of altering the state of the critical interface comprises sending at least one packet out over the critical interface to instruct another network device that the critical interface will be deactivated.

8. The method of claim 1, wherein the network device is master of the first interface, and where the change in interface group status is caused by a network event other than a failure of the first interface.

9. The method of claim 8, wherein the network event is a failure of the critical interface on the network device.

10. A network device, comprising control logic configured to enable a network manager to:
  defining an interface group including at least a first interface on the network device, said interface group having an interface group status;
  assigning the interface group to a critical interface on the network device, said critical interface being different than the first interface;
  detecting a change in the interface group status from a first interface group status state to a second interface group status state; and
  alter a state of the critical interface on the network device in response to the detected change in to interface group status.

11. The network device of claim 10, wherein the control logic is configured to alter the state of the critical interface comprises deactivating the critical interface.

12. The network device of claim 11, wherein the critical interface comprises an interface to a local area network.

13. The network device of claim 10, wherein the interface group further comprises at least a second interface, and wherein the control logic is configured to activate the second interface in response to the detected change in the interface group status.

14. The network device of claim 13, wherein the interface group further comprises a second interface to a static tunnel, and wherein the control logic is further figured to deactivate the second interface in response to the detected change in the interface group status.

15. The network device of claim 13, wherein the second interface is an interface to a link to a network manager.

16. The network device of claim 10, wherein the control logic is configured to alter the state of the critical interface by sending at least one packet out over the critical interface to instruct another network device that the critical interface will be deactivated.

17. The network device of claim 10, wherein the network device is master of the first interface, and where the change in interface group status is caused by a network event other than a failure of the first interface.

18. The network device of claim 17, wherein the network event is a failure of the critical interface on the network device.

* * * * *